(12) United States Patent
Gelfand

(10) Patent No.: US 7,200,600 B2
(45) Date of Patent: Apr. 3, 2007

(54) DATA CELLS, AND A SYSTEM AND METHOD FOR ACCESSING DATA IN A DATA CELL

(76) Inventor: Boris Gelfand, 7986 Autumn Ridgeway, Chanhassen, MN (US) 55317

( * ) Notice: Subject to any disclaimer, the term of this patent is extended or adjusted under 35 U.S.C. 154(b) by 83 days.

(21) Appl. No.: 09/896,858

(22) Filed: Jun. 29, 2001

(65) Prior Publication Data

US 2002/0038303 A1    Mar. 28, 2002

Related U.S. Application Data

(60) Provisional application No. 60/215,447, filed on Jun. 30, 2000.

(51) Int. Cl.
*G06F 7/00* (2006.01)
*G06F 17/00* (2006.01)
(52) U.S. Cl. ........................ 707/100; 707/103
(58) Field of Classification Search ........... 707/100, 707/103 R, 103
See application file for complete search history.

(56) References Cited

U.S. PATENT DOCUMENTS

| | | | |
|---|---|---|---|
| 4,864,497 A * | 9/1989 | Lowry et al. | 707/102 |
| 5,371,675 A | 12/1994 | Greif et al. | |
| 5,598,519 A * | 1/1997 | Narayanan | 715/504 |
| 5,717,924 A * | 2/1998 | Kawai | 707/102 |
| 5,819,293 A | 10/1998 | Comer et al. | |
| 5,852,819 A | 12/1998 | Beller | |
| 5,893,087 A | 4/1999 | Wlaschin et al. | |
| 5,907,846 A * | 5/1999 | Berner et al. | 707/103 R |
| 5,930,799 A * | 7/1999 | Tamano et al. | 707/102 |
| 5,933,634 A | 8/1999 | Enokido et al. | |
| 5,937,155 A | 8/1999 | Kennedy et al. | |
| 5,960,437 A | 9/1999 | Krawchuk et al. | |
| 5,970,506 A | 10/1999 | Kiyan et al. | |

(Continued)

FOREIGN PATENT DOCUMENTS

JP           6052139       2/1994

OTHER PUBLICATIONS

Richard Hull & Roger King, Semantic Database Modeling: Survey, Applications, and Research Issues, ACM Computing Surveys, vol. 19, No. 3, Sep. 1987.

(Continued)

*Primary Examiner*—Jeffrey Gaffin
*Assistant Examiner*—Cindy Nguyen
(74) *Attorney, Agent, or Firm*—Beck & Tysver PLLC

(57) ABSTRACT

A method and system is presented for storing data in data cells containing only a single element of data. Each data cell includes four components: an Entity Instance identifier ("O"), an Entity Type identifier ("E") an Attribute Type identifier ("A"), and an Attribute Value ("V"). Groups of cells with identical O and E values constitute a cell set. Every cell contains a unique combination of O, E, A, and V. Relationships between cell sets are established by creating two synapse cells. The first synapse cell has O and E values of the first cell and has A and V values equal to the E and O value, respectively, of the second cell. The second synapse cell, has O and E values of the second cell, and has as its A and V values the E and O value, respectively, of the first cell set.

12 Claims, 3 Drawing Sheets

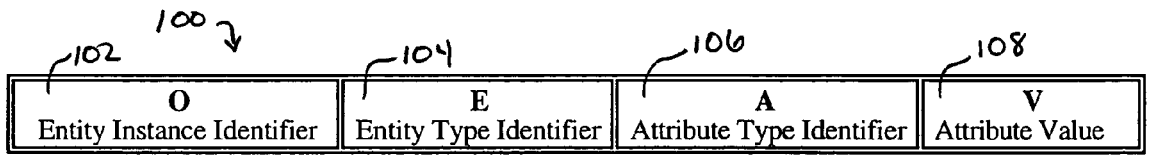

U.S. PATENT DOCUMENTS

| | | | |
|---|---|---|---|
| 6,047,297 A | | 4/2000 | Johnson et al. |
| 6,070,165 A | * | 5/2000 | Whitmore ................... 707/101 |
| 6,081,809 A | | 6/2000 | Kumagai |
| 6,101,502 A | * | 8/2000 | Heubner et al. ........ 707/103 R |
| 6,122,641 A | * | 9/2000 | Williamson et al. .... 707/103 R |
| 6,154,748 A | * | 11/2000 | Gupta et al. ................. 707/102 |
| 6,195,651 B1 | * | 2/2001 | Handel et al. .................. 707/2 |
| 6,208,992 B1 | * | 3/2001 | Bruckner .................... 707/100 |
| 6,356,896 B1 | * | 3/2002 | Cheng et al. ................... 707/4 |
| 6,397,206 B1 | * | 5/2002 | Hill et al. ....................... 707/2 |
| 6,421,658 B1 | * | 7/2002 | Carey et al. .................... 707/2 |
| 6,438,562 B1 | * | 8/2002 | Gupta et al. ................. 707/201 |
| 6,714,936 B1 | | 3/2004 | Nevin, III |
| 6,917,943 B2 | * | 7/2005 | Butler ........................ 707/100 |

OTHER PUBLICATIONS

David W. Shipman, The Functional Data Model and the Data Language DAPLEX, ACM Transactions on Database Systems, vol. 6, No. 1, Mar. 1981, pp. 140-173.

D.S. Batory, T.Y. Leung and T.E. Wise, Implementation Concepts for an Extensible Data Model and Data Language, ACM Transactions on Database Systems, vol. 13, No. 3, Sep. 1988, pp. 231-262.

Niels Nes, Architecture of Monet, Fri, Jul. 26 15:20:35 MET DST 1996, http://homepages.cwi.nl/~niels/Pub/image_retrieval/node4.html.

* cited by examiner

Figure 1 (Prior Art)

EMPLOYEE

| Employee Name | Social Security # | Address | Salary |
|---|---|---|---|
| Johnson | 100-10-1000 | Minneapolis | 50,000 |
| Anderson | 200-20-2000 | Milwaukee | |
| Rodriguez | 300-30-3000 | Cleveland | 30,000 |

Figure 2 (Prior Art)

PROJECT

| Project Name | Project Size |
|---|---|
| Red | Large |
| Yellow | Medium |
| Green | Small |

Figure 3 (Prior Art)

EMPLOYEE PROJECT

| Project Name | Employee Name |
|---|---|
| Red | Johnson |
| Red | Anderson |
| Yellow | Rodriguez |
| Green | Rodriguez |

Figure 4

| O | E | A | V |
|---|---|---|---|
| Entity Instance Identifier | Entity Type Identifier | Attribute Type Identifier | Attribute Value |

Figure 5

| O | E | A | V |
|---|---|---|---|
| Object ID | Employee | Salary | 50,000 |

Figure 6

| O | E | A | V |
|---|---|---|---|
| 1 | Employee | Employee Name | Johnson |
| 1 | Employee | Social Security | 100-10-1000 |
| 1 | Employee | Address | Minneapolis |
| 1 | Employee | Salary | 50,000 |
| 2 | Employee | Employee Name | Anderson |
| 2 | Employee | Social Security | 200-20-2000 |
| 2 | Employee | Address | Milwaukee |
| 3 | Employee | Employee Name | Rodriguez |
| 3 | Employee | Social Security | 300-30-3000 |
| 3 | Employee | Address | Cleveland |
| 3 | Employee | Salary | 30,000 |
| 20 | Project | Project Name | Red |
| 20 | Project | Size | Large |
| 21 | Project | Project Name | Yellow |
| 21 | Project | Size | Medium |
| 22 | Project | Project Name | Green |
| 22 | Project | Size | Small |

Figure 7

| O | E | A | V |
|---|---|---|---|
| 1 | Employee | First Name | Sue |
| 1 | Employee | Spouse | Joe |
| 1 | Employee | Title | President |

Figure 8

| O | E | A | V |
|---|---|---|---|
| 1 | Employee | Employee Name | Johnson |
| 20 | Project | Project Name | Red |
| 1 | Employee | Project | 20 |

Figure 9

| O | E | A | V |
|---|---|---|---|
| 1 | Employee | Employee Name | Johnson |
| 20 | Project | Project Name | Red |
| 20 | Project | Employee | 1 |

Figure 10

| O | E | A | V |
|---|---|---|---|
| 1 | Employee | Employee Name | Johnson |
| ... | ... | ... | ... |
| 22 | Project | Size | Small |
| 1 | Employee | Project | 20 |
| 2 | Employee | Project | 20 |
| 3 | Employee | Project | 21 |
| 3 | Employee | Project | 22 |
| 20 | Project | Employee | 1 |
| 20 | Project | Employee | 2 |
| 21 | Project | Employee | 3 |
| 22 | Project | Employee | 3 |

DATA CELLS, AND A SYSTEM AND METHOD FOR ACCESSING DATA IN A DATA CELL

CROSS-REFERENCE TO RELATED APPLICATIONS

This application claims the benefit of U.S. Provisional Application Ser. No. 60/215,447, filed on Jun. 30, 2000.

TECHNICAL FIELD

The present invention relates generally to database systems. More particularly, the present invention relates to a system and method for storing and accessing data in data cells.

BACKGROUND OF THE INVENTION

Current database technology generally relies on one of three main types: relational databases, object-oriented databases, or a combination of relational and object-oriented databases. Relational databases divide the world into tables, with columns defining data fields and rows defining data records. Relational databases then use relationships and set theory to model and manage real-world data. Object-oriented databases model the world in objects, in which data is encapsulated into objects and associated with methods and procedures. Object-relational databases are a combination of the previous two types.

All of these database constructs are primarily concerned with organizing data into predefined formats and structures. In order to represent the data, an object or a table must be defined with known data characteristics. For instance, before data can be stored in an object, the object must be defined to allow certain types of data, and the object must be pre-associated with relevant procedures. Alternatively, in the relational database construct, a table must be defined before any data can be stored in the table, with each column being defined to allow only certain amounts and types of data.

Unfortunately, this pre-defining of data is always done without a perfect knowledge of the real-world data being modeled. As a result, once the database is actually implemented, changes often must be made to the table definitions or objects so as to more accurately reflect the real-world data. These changes will typically require that the database be reconstructed according to the new definitions. In addition, even after an optimum definition of the real-word data is created, the existing database constructs are not flexible enough to handle unique situations that do not fit the optimum definition. Once this definition is created, along with the related data formats, relationships, and methods, the created structure cannot be easily modified to allow the representation of the unusual case.

What is needed is a database construct that is not as rigid as the existing models of relational and object-oriented databases. This preferred model would not require a pre-definition of the data, but would rather allow data to be entered as it is encountered. Associations between data elements could be developed on-the-fly, and new data could be added to the system even if the pre-existing model did not expect such data to exist.

SUMMARY OF THE INVENTION

The present invention meets the needs and overcomes the associated limitations of the prior art by storing data in cells. A data cell contains only a single element of data. By storing all data in these cells, data can be dynamically structured according to changing needs. In addition, the information stored in the cell is easily accessible, meaning that data extrapolation is quick and easy. Additional references to a particular data value will always use the one data value that has been dynamically normalized by the present invention. Finally, meta data that defines data structures and types are stored in data cells, which allows the data collection to be self-defining.

The data cell of the present invention includes four elements: an Entity Instance Identifier (identified in this application through the letter "O"), an Entity Type Identifier ("E"), an Attribute Type Identifier ("A"), and an Attribute Value ("V"). For instance, the existence of an employee who is named "Johnson" would be represented by a single cell. The Entity Type Identifier would be an "Employee." The Entity Instance Identifier is an identifier, such as the number "1," that allows the employee to be uniquely identified. The Attribute Type Identifier would be the "Employee Name," and the Attribute Value would be "Johnson." The data cell would look like the following:

| O | E | A | V |
|---|---|---|---|
| 1 | Employee | Employee Name | Johnson |

Groups of cells with identical O and E values constitute a cell set, and contain information about a specific instance of an entity. Every cell contains a unique combination of O, E, A, and V, meaning that each cell is unique within any particular information universe.

Relationships between cells and cell sets are created through the use of "linking" or "synapse" cells. Synapse cells are created through a process of transmutation. In transmutation, two cell sets are associated with each other through the creation of two synapse cells. The first synapse cell has the O and E values of the first cell set, and has an A and V value equal to the E and O value, respectively, of the second cell set. The second synapse cell has the O and E values of the second cell set, and has as its A and V values the E and O value, respectively, of the first cell set.

BRIEF DESCRIPTION OF THE DRAWINGS

FIG. 1 is a prior art database table showing a sample representation of employee data in a relational database system.

FIG. 2 is a prior art database table showing a sample representation of project data in a relational database system.

FIG. 3 is a prior art database table showing a sample representation of relationship data in a relational database system.

FIG. 4 is a schematic illustration of a cell of the present invention showing the four components of a data cell.

FIG. 5 shows an example data cell.

FIG. 6 is a cell listing of present invention data cells containing the data stored in the tables shown in FIGS. 1 and 2.

FIG. 7 is a cell listing showing three cells that can be added to the cell set list.

FIG. 8 is a schematic drawing showing the first stage of transmutation to create a synapse cell linking an employee cell set with a project cell set.

FIG. 9 is a schematic drawing showing the second stage of transmutation to create a second synapse cell linking a project cell set with an employee cell set.

FIG. 10 is a cell listing showing a portion of the data cells shown in FIG. 6 along with the synapse cells setting forth the relationships found in FIG. 3.

DETAILED DESCRIPTION OF THE INVENTION

1. Prior Art

FIGS. 1 through 3 show three relational tables as would be used in the prior art. The first table 10 shown in FIG. 1 contains employees. There are four columns in this table 10, namely employee name 12, social security number 14, address 16, and salary 18. These columns 12, 14, 16, and 18 define the different types of data that can be contained in table 10. Table 10 also contains three rows 20 of data. Each row 20 contains information about a different employee in the table 10. Data values for a relational data table such as table 10 are determined by finding the field that exists at the cross section between a particular row 20 and a particular column 12, 14, 16, or 18.

Similarly, the second table 40 shown in FIG. 2 contains information about projects that employees might work on for their employer. The projects table 40 shown in FIG. 2 contains only two columns, namely a project name column 42 and a project size column 44. The projects table 40 contains information about three projects, and therefore the table contains exactly three rows 46.

It is often important in databases to model the fact that some data is associated with other data. In the example of employees and projects, as shown in FIGS. 1 and 2, the database should show that certain employees work on certain projects. If only one employee can be assigned to a project, it would be possible to associate an employee with a project simply by adding an employee column to the project table 40. Similarly, if each employee were assigned only to a single project, a project column in the employee table 10 would serve to make the association.

However, in the real world, it is likely that each project will have more than one employee assigned to it, and it is likely that each employee will be assigned to more than one project. To handle the possibility of these types of many-to-many relationships, it is necessary to utilize a third table 60, such as that shown in FIG. 3. This third table 60 contains only two columns, namely project name 62 and employee name 64. The project name column 62 contains the same type of information as the project name column 42 in table 40. Likewise, employee name column 64 contains the same information as employee name column 12 of table 10. Each row 66 represents a relationship between a row 20 in table 10 (i.e., an employee) and a row 46 in table 40 (i.e., a project). Thus, table 60 shows that the Red project has two employees working on it, namely Johnson and Anderson, while the Yellow and Green projects have only a single employee assigned to them, namely Rodriguez.

Very often, relational databases utilize key fields to aid in data access. The data in a key field must be unique for the entire table. Thus, a key field for the employee table 10 might be the social security number column, since the U.S. government strives to ensure that each social security number is unique to one individual. In project table 40, it might be wise to create a project number column that is subject to a uniqueness constraint to ensure that no two rows 46 contain the same project number. The key fields are then pre-indexed, which allows fast access to data in a table when the key field is known. These key fields can then be used to create efficient relationships in a table such as table 60.

2. Data Cells

The present invention differs from traditional relational and object-oriented databases in that all data is stored in data cells 100. In its most generic sense, a data cell 100 is a data construct that contains a single attribute value. In comparison to a relational database table, a single data cell would contain the value of a field found at a single column and row intersection. The data cell 100 of the present invention differs from an intersection in a data table in that the data cell 100 is not stored within a table or an object construct. Because there is no external construct to associate one cell 100 with another, each data cell 100 of the present invention must be self-identifying. In other words, the data cell 100 must contain not only the value of interest, but it also must contain enough information to identify the attribute to which the value relates, and to associate the attribute with a particular instance of an entity.

As shown in FIG. 4, the preferred embodiment of a data cell 100 utilizes four fields: an Entity Instance Identifier 102, an Entity Type Identifier 104, an Attribute Type Identifier 106, and an Attribute Value 108. These four fields 102, 104, 106, and 108 are also identified by the one letter titles "O," "E," "A," and "V," respectively.

The O field 102 is the Entity Instance Identifier, and serves to uniquely identify the entity that is associated with the data cell 100. The E field 104 is the Entity Type Identifier, which identifies the type of entity associated with the cell 100. The O field 102 and the E field 104 together uniquely identify an entity in an information universe. An information or data universe is defined as the complete collection of data cells 100 that exist together. All cells 100 with the same O field 102 and E field 104 within an information universe are considered part of the same cell set 101. All cells 100 within a cell set 101 are used to store data and relationships about the particular entity instance identified by the combination of the O and E fields 102, 104.

The A or Attribute Type Identifier field 106 indicates the type of information found in the cell 100. Finally, the V or Attribute Value field 108 contains the actual real-world information that is found in the cell 100. The data in V 108 can be of any type, including a character string, a number, a picture, a short movie clip, a voice print, an external pointer, an executable, or any other type of data.

Each cell 100 contains one unit or element of information, such as the fact that a particular employee makes $50,000 per year. The data cell 100 that contains this information might look like that shown in FIG. 5. The O field 102 contains the phrase "Object ID," which indicates that the O field 102 contains some type of identifier to uniquely identify the employee that has this salary. In the preferred embodiment, the object identifiers in the O field 102 are integers. The E field 104 of FIG. 5 indicates that the type of entity that this cell 100 applies to is an employee. The A field 106 shows that this cell 100 describes the salary attribute. Finally, the V field 108 contains the actual, real-world data for the cell 100, namely the $50,000 salary.

FIG. 6 shows the data found in FIGS. 1 and 2 in the form of data cells 100 of the current invention. For each employee in table 10, the four columns 12, 14, 16, and 18 of data are embodied in four separate data cells 100. The data for the employee named Johnson are found in the first four data cells 100 in FIG. 6. Since these first four data cells 100 all contain the same O and E values, these cells 100 form a cell set 101. More specifically, the O field 102 and E field 104 indicate that this first cell set 101 contains information about instance number "1" of an entity of type "Employee." The A fields 106 of these four cells 100 represent the four attributes for which data has been stored, namely Employee Name, Social Security, Address, and Salary. The V fields 108 holds the actual values for these attributes.

An examination of FIGS. 1, 2, and 6 reveals that all of the information stored in tables 10 and 40 has been replicated in individual data cells 100 of FIG. 6. In FIG. 1, the employee Anderson has no salary value in column 18. Thus, the second cell set 101 in FIG. 6 contains only three cells 100, since no cell 100 is needed to represent that fact that no information is known about Anderson's salary. This differs from relational database table of FIG. 1, where each column 12, 14, 16, and 18 must exist for all employee rows 20, even in cases where no value exists and the field simply sits empty.

Moreover, this flexibility makes it possible to have additional cells 100 for some cell sets 101 that do not exist in other cell sets 101. FIG. 7 shows three possible additional cells 100 that relate to the employee named "Johnson." With the flexibility of the cell-based data structure of the present invention, it is possible to add cells 100 such as those shown in FIG. 7 on the fly. There is no need to restructure the database to allow such new information, as would be required if new information were to be tracked in a prior art relational or object oriented database.

3. Transmutation

As shown in FIG. 3, an association between the employee named Johnson and the project named Red is created in a relational database by creating a row 66 in a relationship table 60. An association between cells 100 and/or cell sets 101 can also be created in the cell-based data structure of the present invention. This is accomplished through the use of special types of cells known as synapse cells 110.

Synapse cells 110 are created through a process known as transmutation, which is illustrated in FIGS. 8 and 9. FIG. 8 shows two conventional cells 100, the first belonging to the cell set 101 relating to the employee named Johnson, and the second belonging to the cell set 101 relating to the Red project. The synapse cell 110 that establishes an association between these two cell sets 101 is created by making a new synapse cell 110 based upon the values of cells 100 from the two cell sets 101. The new synapse cell is given the same O 102 and E 104 values of the first cell set 101, in this case the values "1" and "Employee." The A 106 and the V 108 values of the synapse cell 110 are taken from the E 104 and the O 102 values, respectively, of the second cell 100. This "transmutation" of the existing cells 100 into a new synapse cell 110 is represented in FIG. 8 by four arrows.

The association of the two cell sets 101 is not complete, however, with the creation of a single synapse cell 110. This is because every association created in the present invention is preferably a two-way association, and therefore requires the creation of a second synapse cell, as shown in FIG. 9. This second synapse cell 110 is created using the same O 102 and E 104 values as that of the second cell 100. The A 106 and the V 108 values of this second synapse cell 110 are taken from the E 104 and the O 102 values, respectively, of the first cell 100 being associated. The transmutation into the second synapse cell 110 is shown by the arrows in FIG. 9.

When the two synapse cells 110 shown in FIGS. 8 and 9 have been created, then the association between the cell sets 101 has been completed. FIG. 10 shows the cell listing of FIG. 6, with the first and last cells 100 of FIG. 6 surrounding vertical ellipses that represent all of the other cells 100 of FIG. 6. In addition to the cells 100 of FIG. 6, the cell listing of FIG. 10 includes the synapse cells 110 that are needed to represent the relationships shown in table 60 of FIG. 3. It is clear that each synapse cell 110 has a partner synapse cell 110 that shows the same association in the opposite direction. Thus, eight synapse cells are used to represent the four relationships shown in table 60 of FIG. 3.

The synapse cells 110 are generally treated the same as other cells 100 that exist in a data universe. Occasionally, it is useful to be able to know whether a particular cell 100 contains actual data, or is a synapse cell 110. In the present invention, this is accomplished by associating a value, bitmap, or other flagging device with each cell 100 in the data universe. By examining this value, it would be possible for a database management system to immediately determine whether the cell 100 is a synapse cell 110 or contains real-world data.

The terms synapse and cell are used in this description to allude to the similarity between the present invention and the way that the human brain is believed to store memories. When the brain encounters new data, the data is stored in the brain's memory cells. The brain does not pre-define the data into tables or objects, but rather simply accepts all data "on-the-fly" and puts it together later.

Research has shown that the synapses in the brain hook cells together. Where synapse pathways are more frequently traversed in the brain, those pathways become thicker or are connected with more synapses. As a result, these connections become stronger. At the same time, other connections can be formed in the brain that can be loose or incorrect. Yet these memory errors to not corrupt the database of the brain. Rather, the brain is constantly checking associations for validity, and correcting those associations as needed.

This is similar to the present invention. Data is encountered and placed into data cells 100. There is no need to predefine tables or objects before a new source of data is encountered. New cells 100 are simply created as needed. Synapse cells 101 can be formed between those data cells 100 on the fly. The associations that are represented by these synapse cells 101 can be strong or week, and be broken as needed without altering the structure of the database.

4. Conclusion

The above description provides an illustrative version of the present invention. It should be clear that many modifications to the invention may be made without departing from its scope. For instance, it would be possible to include only some of the elements of the present invention without exceeding the essence of the present invention. Therefore, the scope of the present invention is to be limited only by the following claims.

What is claimed is:

1. A computer readable storage media comprising a collection of data relating to multiple instances of multiple entity types, the computer readable storage media comprising:
   a computer readable memory having a plurality of data cells containing all of the data in the collection, with each data cell being a data construct containing
   i) a single instance identifier value identifying one specific instance of a specific entity type;
   ii) a single attribute type identifier value identifying one specific attribute type for the specific entity type; and
   iii) an attribute value for the identified one specific attribute type, such that each data cell contains the attribute value for only the one specific attribute type and for only the one specific instance of the specific entity type and does not contain the attribute value for any other attribute type or any other instance of the specific entity type;

wherein each data cell is self-identifying.

2. The data collection of claim 1, wherein each data cell further contains:

iv) a single entity identifier value identifying the specific entity type.

3. The data collection of claim 2, wherein at least two data cells having the same instance identifier value and the same entity identifier value together define a cell set containing all of the data in the collection relating to the one specific instance of the one specific entity type.

4. The data collection of claim 2, wherein at least one data cell has an attribute value that contains multiple, separate values relating to the specific attribute type of the specific instance of the specific entity type.

5. The data collection of claim 2, wherein each data cell has only four fields relating to actual data, the four fields containing the instance identifier value, the entity identifier value, the attribute type identifier, and the attribute value.

6. The data collection of claim 5, wherein no two data cells contain the same values in all of the four fields.

7. A method of creating a collection of data cells stored on a computer system, wherein each data cell contains a single element of data relating to a specific instance of an entity, the method comprising:

a) creating a first and a second data cell stored on the computer system, both having the same format and fields, the first and second data cell each containing a first field, a second field, a third field, and a fourth field, each field having a value;

b) creating a linking cell stored on the computer system defining an association between the first data cell and the second data cell, the linking cell having four fields each having values, the value of two of the fields of the linking cell being the same as the values of the first and second fields of the first data cell; the value of the remaining two fields of the linking cell being the same as the values of the first and second fields of the second data cell.

8. The method of claim 7, wherein the linking cell has the same format as the first and second data cells.

9. The method of claim 8, wherein the linking cell utilizes a flag to indicate that the linking cell contains linking information.

10. The method of 8, wherein the first, second, and linking cells each contain the following four fields as their first, second, third, and fourth fields:

i) an entity instance field;

ii) an entity type field;

iii) an attribute type field; and iv) an attribute value field.

11. The method of claim 10, wherein the linking cell contains the entity instance field value and the entity type field value of the first data cell as the values of its own entity instance field and its entity type field, respectively; and further wherein the linking cell contains the entity instance field value and the entity type field value of the second data cell as the values of its own attribute value field and its attribute type field, respectively.

12. The method of claim 11, further comprising a second linking cell also having an entity instance field, an entity type field, an attribute type field, and an attribute value field, wherein the second linking cell contains the entity instance field value and the entity type field value of the second data cell as the values of its own entity instance field and its entity type field, respectively; and further wherein the second linking cell contains the entity instance field value and the entity type field value of the first data cell as the values of its own attribute value field and its attribute type field, respectively.

* * * * *

UNITED STATES PATENT AND TRADEMARK OFFICE
CERTIFICATE OF CORRECTION

PATENT NO. : 7,200,600 B2  Page 1 of 1
APPLICATION NO. : 09/896858
DATED : April 3, 2007
INVENTOR(S) : Boris Gelfand It is certified that error appears in the above-identified patent and that said Letters Patent is hereby corrected as shown below:

Title Page, Item (57), Column 2 (Abstract)
Line 10
After "cell" insert --,--.

Title Page, Item (57), Column 2 (Abstract)
Line 12
Delete "cell," and insert --cell--, therefor.

Column 6
Line 32
Delete "to" and insert --do--, therefor.

Column 8
Line 10
Delete "8," and insert --claim 8,--, therefor.

Signed and Sealed this

Twenty-second Day of July, 2008

JON W. DUDAS
*Director of the United States Patent and Trademark Office*